(No Model.)

W. STELFOX, J. W. O. WALKER, D. CAIRNEY & W. PURVIS.
TIRE FOR VEHICLE WHEELS.

No. 545,547. Patented Sept. 3, 1895.

WITNESSES.
Chas Ovendall
Joseph Bates

INVENTORS.
W. Stelfox
J. W. O. Walker
Douglas Cairney
Wm Purvis
by Wm P. Thompson & Co
attys.

UNITED STATES PATENT OFFICE.

WILLIAM STELFOX, OF MANCHESTER, ENGLAND, AND JAMES W. O. WALKER, DOUGLAS CAIRNEY, AND WILLIAM PURVIS, OF GLASGOW, SCOTLAND.

TIRE FOR VEHICLE-WHEELS.

SPECIFICATION forming part of Letters Patent No. 545,547, dated September 3, 1895.

Application filed February 4, 1895. Serial No. 537,303. (No model.)

*To all whom it may concern:*

Be it known that we, WILLIAM STELFOX, of Manchester, in the county of Lancaster, England, and JAMES WEDDERBURN OGILVY WALKER, DOUGLAS CAIRNEY, and WILLIAM PURVIS, of Glasgow, in the county of Lanark, Scotland, subjects of the Queen of Great Britain, have invented certain new and useful Improvements in Tires for Wheels of Vehicles, of which the following is a specification.

This invention is designed to apply pneumatic tires to the wheels of vehicles without an inner air-tube or bladder and to provide protectors for pneumatic tires when applied to common road-vehicles.

It consists, essentially, in the combination, with the fellies of an ordinary wheel, of a covering of rubber fitting closely over the rim or edges of the fellies and over the iron hoop by which they are held together, with a pad or cushion formed thereon and projecting upward toward the cover, and a cover or tread secured thereto by means of plates or rings bolted to the sides of the wheel, which compress the edges of the cover tightly against the sides of the rubber cover, thereby forming an air-tight joint, the inner side of the cover being formed with an internal cushion to strike against the cushion attached to the wheel to prevent collapse of the tire in case of loss of the air contained therein, and in the combination, with the outer tread, of steel protectors in the form of a number of steel segments placed both inside and outside the outer cover or tread and riveted or bolted together.

The invention will be fully described with reference to the accompanying drawings, in which part of a wheel is shown to illustrate the invention.

Figure 4:
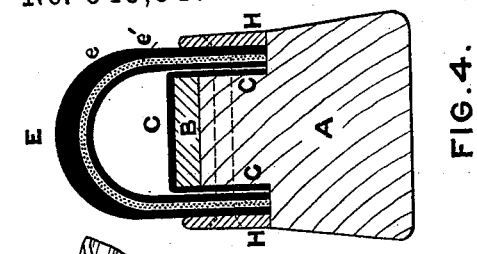
Figure 5:
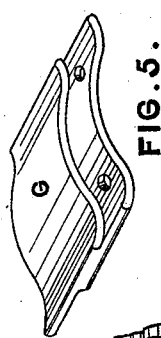
Figure 2:
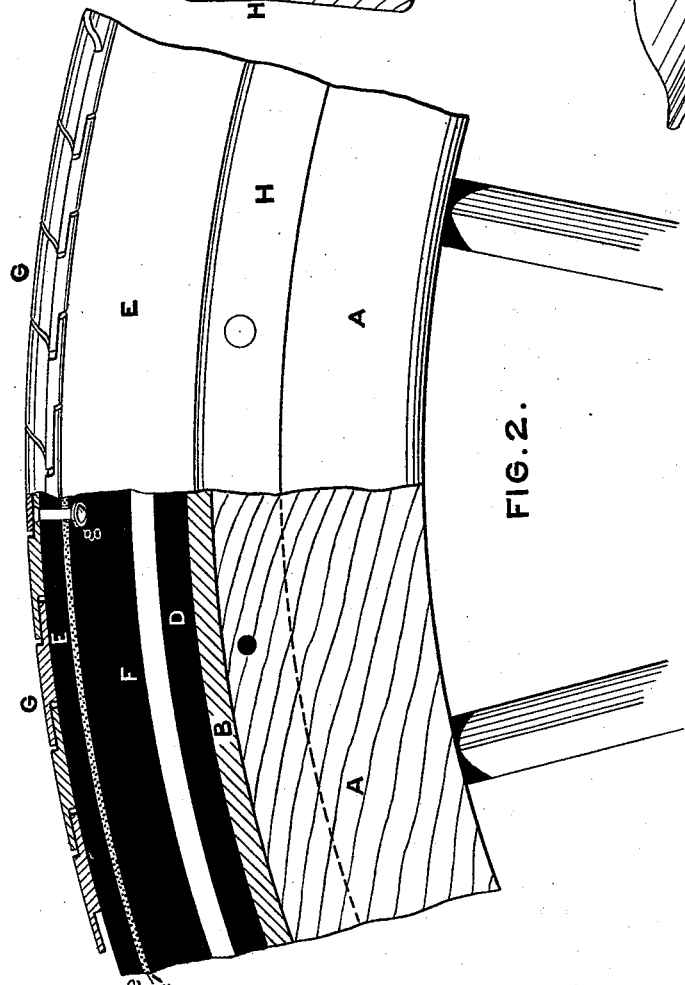
Figure 3:
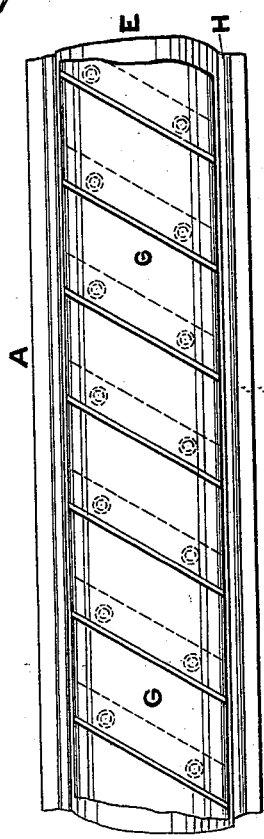
Figure 1:
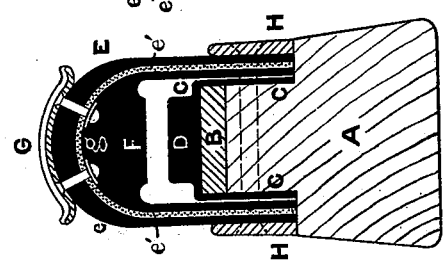

Figure 1 is a transverse section through the tire of the wheel; Fig. 2, a side elevation of same, partly in section; Fig. 3, a plan of same; Fig. 4, a transverse section showing construction of tires for light wheels without internal buffers and without external protector-plates; Fig. 5, a perspective view of protector.

The wheel of the vehicle is constructed very much in the ordinary way for common roads, with wooden fellies A, shod with and held together by a hoop or ring B, of iron, on the periphery, the outer edge, however, being preferably slightly recessed to allow for the fixing of the outer tread. Over the rim or fellies A of the wheel is placed a covering C, of rubber, which covers both the periphery and sides of the fellies and closes all crevices or holes through which air might escape, either drilled in the iron hoop or between it and the wooden fellies. On the upper side of the cover C is formed or placed a cushion or projection D, of rubber or other suitable elastic material. The cushion D extends beyond the periphery of the wheel-rim and is of sufficient thickness to form a buffer or support for the outer cover or tread E, should the air escape therefrom through puncture or otherwise.

The outer or external cover E is fitted over the rim-covering C, with a space between the two to receive air under pressure, and is clamped tightly to both sides of the fellies against the sides of the inner cover C, an air-tight joint being thereby formed between the two covers C and E.

The external cover E is clamped or held in position over the periphery of the wheel-fellies A by means of plates or rings H, bolted or screwed to the sides of the fellies. The cover E, being thus clamped tightly against the inner rubber covering C, enveloping the hoop or ring of iron and the fellies, an air-tight joint is formed; or, if desired or found necessary, the lower edges of the two covers, where they are clamped together, may be treated with suitable cement or solution to make them adhere. The space between the periphery of the inner rubber covering C and the external covering or tread E is afterward pumped or filled with air to any desired pressure.

The inner side of the external cover E is formed or provided with a cushion or projection F, corresponding with the cushion D on the inner cover C, which together will act as a buffer in case of too great a weight being put upon the wheels or of the air escaping from the tire.

The external cover or tread E is formed of rubber $e$ and canvas or other suitable material $e'$, the canvas or other material being embedded in or attached to the rubber $e$. The material $e'$ may be strips of textile material, tape, leather, whip-cord, steel bands, wire, or the like, inserted therein to resist internal pressure, these strips being firmly embedded in the rubber, so that the rubber cannot be easily stripped off or removed therefrom.

Instead of the projections D and F on both the covers C and E, one only may be formed with such projection; or a cushion or buffer may be formed of a ring or hoop, of rubber or other suitable material of any desired thickness, inserted in the air-space prior to the external cover E being placed in position.

The external cover E of the tire may be protected by protector-plates G, placed on the outer surface and held in position by being riveted to a plate or washer $g$ on the inside. The plates G are preferably in the form of short segments of circles of a radius to fit the periphery of the tire and placed diagonally across it. These plates are preferably constructed as illustrated, being riveted or connected together in pairs. As we at present construct the external cover E we prefer to attach the segmental plates G in position with the inner plates or washers $g$ resting against the canvas $e'$, and then attach thereto the buffer F.

For light wheels the cushions D and F may be dispensed with, as in Fig. 4.

What we claim as our invention, and desire to protect by Letters Patent, is—

1. In a pneumatic tire for wheels the combination with the fellies A and hoop B of an inner cover inclosing and covering the periphery and sides of the fellies to prevent the escape of air and provide an air-tight joint an outer cover or tread with a space between the two covers into which air under pressure can be pumped and the rings H, attached to both sides of the wheel by which the covers are secured substantially as described.

2. In a pneumatic tire for wheels the combination with the fellies A and hoop B of the inner cover C covering the fellies the buffer D projecting therefrom the external cover E forming an air space between the two covers the buffer F projecting from the inner side of the cover E the rings H by which the covers are secured to the wheels and the protecting plates G substantially as described.

In testimony whereof we have signed our names to this specification in the presence of two subscribing witnesses.

W. STELFOX.
J. W. O. WALKER.
DOUGLAS CAIRNEY.
WM. PURVIS.

Witnesses to the signature of William Stelfox:
 J. OWEN O'BRIEN,
 CHAS. OVENDALE.

Witnesses to the signatures of James Wedderburn Ogilvy Walker, Douglas Cairney, and William Purvis:
 ALBERT LOUIS,
 GEORGE YOST.